United States Patent [19]
Basavaiah et al.

[11] Patent Number: 5,915,088
[45] Date of Patent: Jun. 22, 1999

[54] INTERPROCESSOR MESSAGING SYSTEM

[75] Inventors: Murali Basavaiah, Sunnyvale; Joseph D. Kinkade, Menlo Park; Gary F. Campbell, Palo Alto; Srinivasa Murthy, San Jose, all of Calif.

[73] Assignee: Tandem Computers Incorporated, Cupertino, Calif.

[21] Appl. No.: 08/761,116

[22] Filed: Dec. 5, 1996

[51] Int. Cl.$^6$ ................................................. G06F 15/02
[52] U.S. Cl. ........................................................ 395/200.28
[58] Field of Search ..................................... 395/733, 868, 395/182.1, 800.22, 311, 200.43, 200.44, 200.46, 200.68, 800.28, 800.14, 800.01

[56] References Cited

U.S. PATENT DOCUMENTS

| | | | |
|---|---|---|---|
| 5,165,023 | 11/1992 | Gifford | 395/311 |
| 5,197,129 | 3/1993 | Kayama et al. | 395/868 |
| 5,361,363 | 11/1994 | Wells et al. | 395/800.22 |
| 5,574,849 | 11/1996 | Sonnier et al. | 395/182.1 |
| 5,675,807 | 10/1997 | Iswandhi et al. | 395/733 |

*Primary Examiner*—Moustafa M. Meky
*Attorney, Agent, or Firm*—Townsend and Townsend and Crew LLP

[57] ABSTRACT

A multiprocessor system is configured so that each of the central processing units (CPUs) of the system have accessed at least portions of the memory of each other CPU. Interprocessor messaging is conducted by a CPU writing to, or reading from, the memory of another CPU of the system.

26 Claims, 5 Drawing Sheets

INTERPROCESSOR MESSAGING SYSTEM

BACKGROUND OF THE INVENTION

The present invention relates generally to multiple processor systems, and in particular to a multiple processor system architecture with non-shared memory with interprocessor communication capability that is provided by permitting any processor of the system to access the memory of any other processor of the system.

Although multiple processor systems have been known for some time, they have become cost-effective only recently due to recent advances in microprocessor design and fabrication. Multiple processor systems achieve cost effective efficiencies over large, single-processor computing systems by breaking up tasks into smaller portions for concurrent execution and service by the multiple processors. Multiple processor systems are ideally suited for such tasks as transaction processing and concurrent database servers, to name just a few. The redundancy of the multiple processors of such systems also provides a basis for fault tolerant designs and architectures.

However, regardless of what uses are made of such multiple processor designs, the individual processors of such systems usually do not operate in a vacuum; that is, there is often a need for the individual processors of the system to communicate with one another. For example, some multiple processor architectures limit access to peripheral devices to specific processors, requiring other processors of the system to access the peripheral devices through these specific processors. Thus, a peripheral device used for secondary data storage (e.g., a disk system) may be controlled by an application process resident on a processor directly connected to that peripheral device. Another processor of the system, wishing to access that secondary data storage to store or retrieve data may need to do so through the connected processor, if the requesting processor is not so connected (i.e., does not have direct access). Such systems use some form of interprocessor communication system to provide such (indirect) access to peripheral devices.

Further, a fault tolerant design utilized by one known multiple processor architecture requires each processor of the system to use interprocessor communication to periodically broadcast a message to all other processors, indicating the broadcasting processor's well being. The absence of such a broadcast from any processor within a set period of time will cause a back-up process/processor to assume the workload previously handled by the (now supposed failed) primary processor.

However, interprocessor communication is not free; if an interprocessor communication system is not properly designed it can impose an undesirable time penalty on both the sending and receiving processors. This, in turn, can impact system efficiency by requiring the processors involved in the communication to take time to perform tasks associated with the communication process that could otherwise be used for data processing functions. For example, some traditional multiple processor architectures implement an interprocessor communication protocol that require the sender processor to first notify the receiving or destination processor that a message is forthcoming in order to allow the destination processor to prepare to receive the communication. The normal activity of the destination processor is thereby interrupted so that it can perform the necessary tasks of preparation. Next, the processing activity of the sender processor is then interrupted to involve it in the sending process, perhaps following the transmission with a signal or interrupt to the receiving processor to identify completion of the communication. Similarly, the destination processor must again interrupt other activity—if it can—so that it can handle the received data as necessary, and perhaps reply to the sender processor that the data has or has not been received. The reply, of course, will also have a number of associated interrupts to the sender and receiver processor.

If, for some reason, (e.g., insufficient memory space, involvement in uninterruptable activity, etc.) the receiving processor is unable to accept the communication, the sender processor will need to re-send the communication.

Of course, as the amount of messaging between the individual processors of a multiple processor system increases, interrupting a processor's normal duties for involvement in one or more of the aspects of interprocessor communication will, concomitantly, decrease or diminish the normal work activities of the processor, and with it its efficiency.

Some multiple processor architectures improve system efficiency by providing a communication medium exclusively for interprocessor communication, one that is separate from that medium used for input/output transfers between processors and peripheral devices. This, however, often requires a processor to operate according to two separate protocols, and increases system cost by the additional elements required for the interprocessor communication system.

Accordingly, it should be evident that an interprocessor communication system for multiple processor architectures and designs should impose as little burden as possible on processor involvement in order to maintain the efficiency of processor activities at a high level.

SUMMARY OF THE INVENTION

The present invention provides an interprocessor communication system for a multiple processor system architecture in which each of the individual processors of the system maintain their own separate memory that is accessible to the other processors of the system. That architecture is described more fully in U.S. Pat. No. 5,574,849, and assigned to the assignee of this application. The disclosure of that patent, insofar as is necessary is incorporated herein. The system architecture includes a system-wide network (SAN) that interconnects the processors of the system through routing apparatus to one another and to peripheral devices of the system providing a means for the interprocessor communication of the present invention. Thus, any processor of the system has, through the SAN, direct access to any other processor of the system.

According to the multiple processor architecture described in Ser. No. 08/482,628, now U.S. Pat. No. 5,574,849 each processor incorporates an interface unit capable of accessing main memory of the processor for data structures set up in the memory by the processor. The data structures may be sent to other elements of the system in the form of information packets constructed and communicated by the interface unit—independent of the processor (but often in response to commands by the processor). When such an information packet is sent to a destination processor, the packet may contain a "WRITE" or a "READ" command that, when received by the interface unit of the destination processor, will cause accompanying data to be written to the memory of the destination processor, or cause data to be read (accessed from) the memory of the destination processor for return (by a READ response packet) to the sender processor—where the data is written to the memory of the sender processor.

To summarize, the multiple processor system is structured to provide the individual processors with the capability of writing data to, or reading data from, a memory of any other of the processors of the system. The processors (and peripheral devices) of the system are communicatively interconnected by a SAN that carries data in the form of packets. A processor writes data to the memory of another process through an operation using a WRITE request packet. A processor reads data from the memory of another processor by an operation that uses a READ request packet. A response to a READ request packet is a READ Response packet, conveying the data requested to be accessed from the memory receiving the READ request packet.

Finally, the system described in the application Ser. No. 08/482,628, now U.S. Pat. No. 5,574,849 also uses "Interrupt" packets that write interrupt information to the memory of a processor sent by another processor (or peripheral device). Interrupt packets will cause an interrupt of the processor that receives the Interrupt packet.

According to the present invention, therefore, a method of interprocessor communication involves passing message and other data from one processor of the system to another by writing that message/data to the receiving processor's memory. An alternative is to notify the receiving processor where in the memory of the sending processor the message/date may be obtained. The receiving processor then "reads" the memory of the sending processors to obtain the message/data.

Before proceeding with a more complete summary of the invention, a word about terminology: In a single communication between two processors of a system, according to the invention, both processors will "send" information to the other. The processor initiating the communication mostly will be requesting action on the part of the other processor. Accordingly, in order to avoid confusion by referring to a "sending," "receiving," or "destination" processor, since (as will be seen) both processors send and receive and are destinations during a communication conducted according to the present invention, the processor initiating an interprocessor communication will be hereinafter referred to as the "Requesting" processor; the processor that is the other party to the communication will be referred to as the "Responding" processor.

According to a preferred embodiment of the invention, a protocol is provided in which, for amounts of message/data less than a predetermined amount, the Requesting processor will initiate an operation to send a WRITE packet to write the message/data to a predetermined memory location of the Responding processor. That write operation is then followed by a second operation that sends an Interrupt packet to write an interrupt data to the memory of the Responding processor, notifying the Responding processor of the presence of the interrupt data. The interrupt data provides the Responding processor with information about the earlier sent message/data such as its location (in the memory of the Responding processor), size, source (i.e., identity of the Requesting processor), and the memory location of the Requesting processor at which the reply data is to be written by the Responding processor—by a WRITE packet.

For larger amounts of message/data (greater than or equal to the predetermined amount), only an Interrupt packet is sent to (and written to the memory of) the Responding processor. As in the case involving smaller message/data, the Interrupt packet provides the Responding processor with information as to the size, source, and location of the message/data—except that now the location is identified as a memory location in the memory of the Requesting processor. Using a READ packet sent to the Requesting processor, the Responding processor, at a time convenient to it, may retrieve the message/data identified in the interrupt data from the memory of the Requesting processor. (The Requesting processor responds to the READ packet with READ response packets that write the data to the memory of the Responding processor.)

In both cases, reply information is sent by writing the reply, any associated data, and the reply interrupt data to the memory of the Requesting processor.

A number of advantages are achieved by the present invention. First, unlike certain other earlier multiple processor architectures, the present invention does not use a separate communication medium for interprocessor communication. Rather, the same communication medium, and substantially the same messaging protocol, as that used for I/O communication is used for the interprocessor communication.

In an interprocessor communication involving a small amount of message/data, the Responding processor need not allocate all that much predetermined memory space in order to receive such communication. More important may be the avoidance of the interrupt often used in traditional systems to alert a communication destination of an impending transfer. Further, the Responding processor need not take time to prepare for receipt of a communication, and the possibility of not receiving the communication because the Responding processor could not prepare in time is obviated.

Interprocessor communications, according to the present invention, involving larger amounts of data also use only one interrupt for the transfer to inform the Responding processor of the existence of message/data, allowing the Responding process to obtain the data when it is ready, i.e., when it has allocated memory and is ready to accept it. As noted above, not too infrequently, message/data was lost in traditional interprocessor communication operations because the Responding processor would not be ready when the message/data was sent by the Requesting processor, requiring the Requesting processor to attempt the communication again.

These, and other aspects and advantages of the invention will become apparent to those skilled in the art upon a reading of the following description of the invention, which should be taken in conjunction with the accompanying drawings.

DESCRIPTION OF THE PREFERRED EMBODIMENT

As has been indicated hereinabove, the present invention is developed particularly for use with a new multiple processor architecture described in U.S. Pat. No. 5,549,849 (hereinafter "the 849 Patent"). Although the invention, as will be seen by those skilled in this art, can be implemented using other architectures, it is particularly adapted for use for the architecture of the aforementioned patent application. That architecture is described briefly here to a detail only necessary to understand and use the present invention. For more detail, however, reference is made to the Prior, and to the extent necessary the disclosure of the '849 is incorporated herein by reference.

Figure 1:
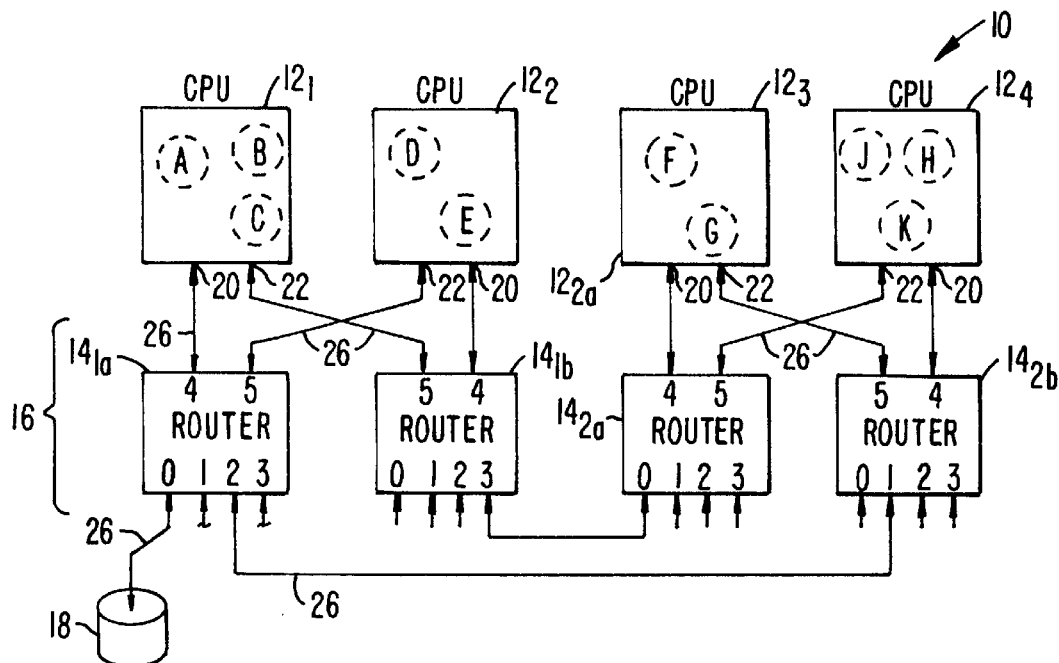
FIG. 1 is a simplified block diagram of a processing system, comprising a number of central processor units (CPUs) structured to employ the teachings of the present invention.

Referring to the Figures, and for the moment specifically FIG. 1, there is generally illustrated the multiple processor architecture of the '849 Patent—designated generally with the reference numeral 10. As FIG. 1 shows, the processing system 10 includes a plurality of central processing units (CPUs) 12 ($12_1$, $12_2$, . . . ). Each CPU 12 connects to two separate routers 14. Thus, the CPUs $12_1$, $12_2$ connect to routers $14_{1a}$, $14_{1b}$ and the CPUs $12_3$, $12_4$ connect to the routers $14_{2a}$, $14_{2b}$. Additional CPUs 12 can be added to the system and would preferably also connect to pairs of routers 14 in the same manner, although additional routers will be needed to interconnect such additional CPUs 12 as more particularly described in the 849 Patent. The routers $14_{1a}$, . . . $14_{2b}$ are what may be called first line routers connecting the CPUs 12 to various peripheral devices directly, such as the mass storage peripheral device illustrated at 18 (a disk storage element) directly, or indirectly through other routers 14 (not shown). In effect, the routers 14, and the communication links 26 that connect them form a system area network (SAN) 16 that enables the individual CPUs 12 to communicate with one another and with the peripheral devices of the system (e.g., disk system 18). Thus, the SAN 16 is structured to provide any CPU 12 with access to any other CPU 12 or any peripheral device.

Each CPU 12 has two input/output (I/O) ports 20, 22, and communication links 26 connect those ports to the ports 4, 5, respectively of the six available ports (0, 1, . . . , 5) of the routers 14. Each communication link 26 can provide simultaneous bi-directional data communication. Communication between system elements (i.e., a CPU 12 and a peripheral device, or another CPU 12) is by message packets that carry a number of command or data bytes encoded as 9-bit "symbols". The symbols are communicated synchronously, and a clock signal is supplied by the element communicating on the link. Thus, for bi-directional communication, twenty signal lines are used to form each link 26, ten signal lines communicating a 9-bit symbol and accompanying clock signal in one direction, and ten signal lines communicating the same in the other direction.

Figure 2:
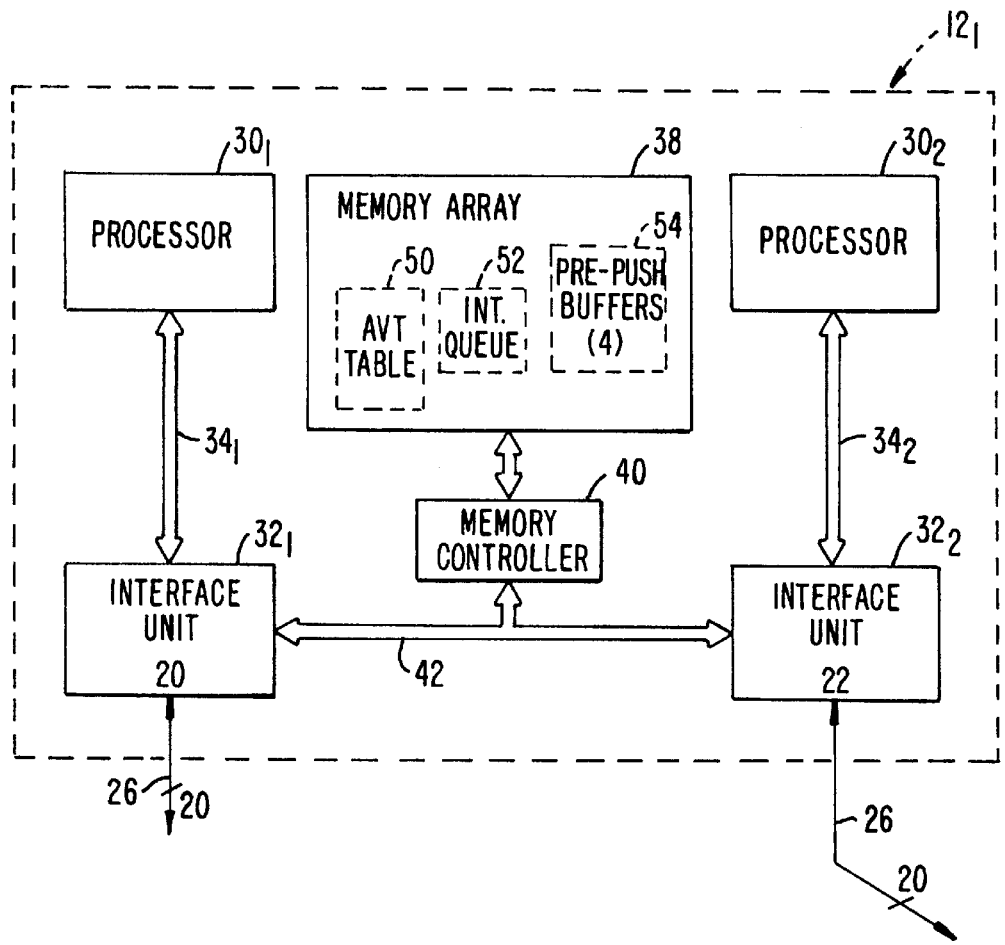
FIG. 2 is a simplified block diagram of a CPU of the processing system of FIG. 1.

Referring now to FIG. 2, a simplified block diagram of the CPU $12_1$ is illustrated. The architecture of the other CPUs 12 are substantially identical so that a discussion of the CPU $12_1$ will apply equally to the other CPUs 12.

FIG. 2 shows the CPU 12 constructed with redundant elements for fault tolerance. The CPU 12 includes a pair of processors 30 ($30_1$, $30_2$) that may, or may not, include cache memory. The processors 30 connect to interface units $32_1$, $32_2$, through bus systems $34_1$, $34_2$. The interface units 32, in turn, provide the processors 30 with access to a memory array 38, via memory controller 40 and memory bus 42, as well as to the ports 20, 22.

The processors 30 operate in synchronized lock-step for cross-check purposes, executing, at any moment in time, the same instruction of the same instruction stream as supplied by the memory 38. The interface units 32, as well, operate in lock-step fashion, performing various tasks in order to serve the processors 30 such as memory accesses and handling all input/output functions. Cross-checking is also employed between the interface units. The interface units 32 themselves have substantial intelligence, so that they are capable of performing various tasks independently of the processors 30 (albeit, for the most part, at the direction of the processors 30) such as direct memory accesses, various input/output communicating functions, and the like. The interface units 32, therefore, handle all communications between the CPU 12 and any peripheral devices, as directed by the processors 30, as well as communications with other CPUs 12.

The redundancy employed in the design of the CPUs 12 is not necessary to the implementation of the messaging techniques of the present invention. Accordingly, the remainder of this discussion will be absent any further discussion of fault tolerant computing and the redundancy aspects of the CPU design. Thus, for example, redundant elements (e.g., processors $30_1$, $30_2$) will be referred to herein after a "logical" element (e.g. logical processor 30). Also, the specific architecture described, as those skilled in this art will readily see, can be replaced with analogous architecture without deviating from a principle aspect of this invention: That each CPU 12 has parts of its memory array 38 accessible to other CPUs 12 of the system 10.

Communication between CPUs 12, as well as communication between a CPU 12 and any peripheral device of the system 10—such as the disk system 18—are conducted in a way that minimizes involvement of the logical processor 30, leaving them more time for processing tasks. To accomplish this feature, the CPUs 12, as well as peripheral devices, communicate by a form of direct access to the memory array 38 of the CPUs 12. System devices are capable of either reading information from, or writing information to, the memory array 38 of a CPU 12. This ability of a system element to write information to the memory array 38 of a CPU 12 is extended to interrupts, allowing a system element to notify a CPU 12 that the attention of its logical processor 30 is called for, together with information in the CPU's memory array explaining the need for processor attention. As will be seen, both of these features form the basis of the interprocessor communication system of the present invention.

The system 10 is structured with a messaging system that performs the input/output (I/O) operations of the CPU 12, employing the service interface units 32. The logical processor 30 do not have the ability to directly conduct I/O transactions, but must use the interface units 32 to do so. In order to perform an output transaction, for example send and store data to the disk storage unit 18, the logical processor 30 construct a data structure in the memory array 38 that describes the data to be stored, together with the other necessary information needed: the identification of the system element to which the data is directed, where it is to be stored, etc. The logical processor 30 will then initiate operation of a block transfer engine (BTE; not shown here). The BTE (not shown) then operates as a direct memory access machine, accessing the memory array to retrieve the data structure and assembling one or more message packets describing the information and data. The packets are then transmitted from the interface units 32 onto the SAN 16 for communication to their intended destination.

Figure 3:
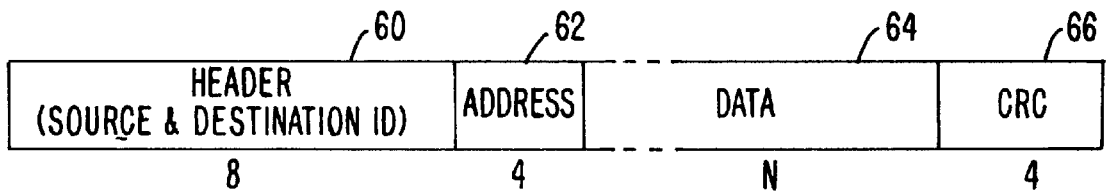
FIG. 3 illustrates the format of a message packet used to communicate commands and data between elements of the processing system of FIG. 1.

Message packets have the format essentially as shown in FIG. 3, or variations of that format, as will be described. Message packets are a collection of 8-bit bytes, and each byte is encoded as a 9-bit symbol for transmission via the SAN 16. Interrupts are also transmitted as packets, and each packet (message or interrupt) will include, as illustrated in FIG. 3, an 8-byte header field 60, containing information that identifies both the source of the packet (source ID) and its destination (destination ID). These identification quantities are three bytes each; the remaining two bytes of the 8-byte header is control information that describes, among other things, the amount of data (if any) in the packet, or the type of access (read or write) desired.

The header field 60 is followed by a 4-byte address field 62. Not all message packets will have an address field 62, but those that do supply a virtual address of a memory location whereat access is to be performed—either to write data or read data. The content of the virtual address field 62 will be translated to a physical address of the memory array 38, using information supplied by an AVT entry (FIG. 4) obtained from the AVT table 50 of the CPU 12 Responding the packet.

The addres0s field 62 is followed by an N-byte data field 64, if data is being transmitted via the packet. Although N could theoretically be any number, it is preferably limited to 64. Data comprising more than 64 bytes are transmitted by multiple packets. If the destination of the message packet is a CPU, and it contains data, the data in the data field 64 will be written to the physical address of a memory array 38 indicated by the virtual address contained in the address field 62.

The packet concludes with four bytes of cyclic-redundancy-check (CRC) information for error checking. The CRC of each communicated packet is checked not only at the destination whereat the packet is received, but also while in route to that destination by each router 14. If the packet is found to have incorrect CRC it is discarded.

Message packets are used to communicate data between the elements of the processing system 10—or to request data. They are used by a CPU 12 to write data, for example, to the disk storage 18, or to communicate data from the disk storage 18 to one of the processors 12 (upon request of the Responding processor 12).

All message packets will have a header field 60, identifying the source and destination of that message packet, as well as a CRC field 66. However, not all message packets will have an address field 62 or a data field 64. For example, a CPU 12 may send a message packet requesting data from another of the CPUs 12 or from the disk storage unit 18. Such a message packet will only identify the data desired by its virtual address (contained in address field 62) and will include only the header, address, and CRC fields 60, 66. The two bytes of control information will identify the message packet as a READ request, requesting data from the destination. The element of the processing system 10 responding to that Read request message packet will use an AVT entry to further define the request—as described below.

When a WRITE request packet is sent from one CPU 12 to another CPU 12 of system 10 (FIG. 1), the accompanying data in the data field 64 of the message packet will be written to the memory array 38 of the recipient CPU by its interface unit 32. Conversely, when a CPU 12 receives a READ request packet, and it is identified as such by the interface units 32, the interface units 32 will access the memory array 32 at a memory address translated from what is provided by the message packet, assemble a READ response packet, and direct the READ response packet back to the "requester" CPU 12.

As indicated above, interrupts are also communicated by message or Interrupt packets as WRITE requests, containing information that identifies such particulars as the action to be taken or requested, and other information needed for the CPU receiving the Interrupt packet to take appropriate action. The interface unit 32 includes an interrupt handler (not shown), a specialized state machine, structured specifically to handle Interrupt packets, including storing the interrupt data in one or more interrupt queues 52 maintained in the memory array 38. When an Interrupt packet is received, and its data stored in the interrupt queue 52, an internal interrupt (as distinguished from an external, message-communicated interrupt) is generated to notify the processor that a interrupt message has been received, and that data identifying the particulars of that interrupt may be found in the interrupt queue 52.

The present invention utilizes the READ request, WRITE request and Interrupt packets for its implementation.

While external access to the memory array 38 of the CPU 12 is permitted, it is not without protection. Each CPU 12 maintains, in the memory array 38, an access validation and translation (AVT) table 50 that contains an entry (FIG. 4) for each system element (CPU 12 or peripheral device such as disk storage device 18) permitted access to the memory array 38 of that CPU. The entry, as will be discussed more fully hereinafter, provides the authorization for access, and the type of access permitted (read, write, or both). The entry includes a translation address that is used to translate an address (the content of the virtual address field 62—FIG. 3) contained in an incoming packet to a physical address, identifying a memory location of the memory array 38 to which data is to be written, or from which data is to be retrieved. The AVT table 50 maintained by each CPU 12, therefore, provides a mechanism that protects against unauthorized or otherwise errant accesses to CPU memory array that could disrupt or damage valid data.

The AVT table of each of the CPUs 12 is created when each is brought on-line; that is, the memory space for the table is allocated, and the necessary pointers to the table installed. The entries are created when needed, although some are created at the outset and may be left unchanged such as, for example, AVT entries permitting write access to memory space reserved to interrupt queues (discussed below) or to memory space for smaller quantities of information forming a part of a message colloquy referred to below as a "pre-push" memory space. The pre-push memory space of each CPU 12 is used for receiving message information less than a particular size as will be described in greater detail below.

Figure 4:
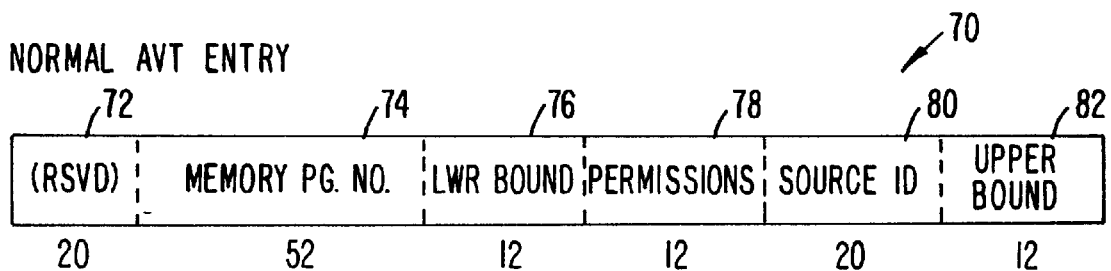
FIG. 4 illustrates the format of a normal access validation and translation (AVT) table entry used to validate and translate a request from one CPU of the processing system of FIG. 1 for access to the memory of another CPU of the system of FIG. 1.

Referring now to FIG. 4, a normal AVT entry 70, as maintained in the AVT table 50, is shown. The AVT entry 70 will correspond to a specific, external element of the system 10 permitted access to a memory page (or range of memory pages) at which read or write access is permitted. (A memory page, as implemented by the present invention, is a four Kbyte portion of the memory array 38, although different sizes of memory pages may also be defined.) For a messaging system, therefore, each CPU 12 can have one or more corresponding entries in the AVT table 50 for each of the other CPUs with which it will communicate.

Figure 5:
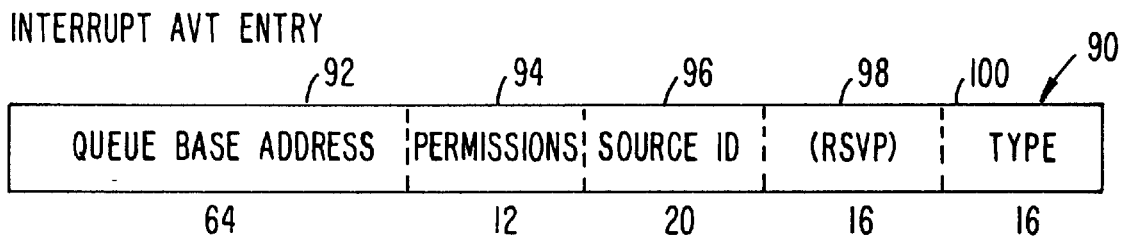
FIG. 5 illustrates the format of an interrupt AVT table entry used to validate incoming, externally generated interrupt requests to a CPU of the processing system of FIG. 1.

Each AVT entry 70 is a 16 byte (128-bit) quadword that includes the five information fields 74–82 illustrated in the FIG. 4. (A sixth 20-bit field 72 is reserved for future expansion.) An AVT entry can have two basic formats: normal and interrupt. FIG. 4 illustrates the format of a normal AVT entry; the interrupt format is illustrated in FIG. 5.

A normal AVT entry is shown (FIG. 4) as including a 52-bit Memory Page Number field 74. The content of the field 74 identifies the physical address of the page of memory array 38 at which memory will be read or written as a result of successful access by a received packet that refers to this AVT entry. The content of the Memory Page Number field will be concatenated with a 12-bit portion of the address field 62 (FIG. 3) of the incoming packet to form a physical address of the location within the memory array 38 at which data will be written or read—if validation is permitted.

While access may be granted to all memory locations of a particular 4K page, access may also be limited to only portions of that page. For that purpose the AVT entry 70 includes two 12-bit fields: a lower bound field 76, and an upper bound field 82. These fields respectively define the upper and lower bounds of the page (identified by field) 74 within which access will be permitted. Attempts to access memory locations not permitted will result in an error being posted to the logical processor 30 via an internal interrupt.

The AVT entry 70 also includes a 12-bit "Permissions" field 78, identifying various permissions granted to the requesting source specified by AVT entry. The Permissions field 78 includes qualifications to memory access, including insofar as is pertinent here a grant or denial of read or write access to the memory array 38 to the requesting source— within memory area identified by the lower and upper Bound fields. An element of the system 10 may be granted read, but not write access to the memory array 38 of the CPU 12, or write but not read access may be granted. Alternatively, using two AVT entries, read (but not write) access may be granted a source to one area of the memory array 38, and write (but not read) access later granted the same source to another area of the memory array 38.

Finally, a 20-bit "Source ID" field 80 of the AVT entry 70 identifies the specific source to which the permission information of the AVT entry applies.

The interface units 32 have an AVT base address register (not shown) containing the starting address in the memory array 38 of the AVT table 50. The high-order 20 bits of the address field 62 (FIG. 3) of a received message packet is combined with the content of the AVT base address register (not shown) by logic (not shown) in the interface units 32 to form the address for accessing the AVT table 50 and thus obtaining the particular AVT entry 70 corresponding to the packet. (The remaining 12 bits of the address field 62 are combined with the content of the memory page number field 74 of the resultant AVT entry to identify the memory location whereat access is desired.)

Once the address of the AVT entry has been formed, the AVT table 50 is accessed for the AVT entry by the interface unit 32. The content of the Permissions field 78 is compared with the type of access identified in the header of the packet (i.e., the control field) as being requested by the packet. If the access requested does not match that permitted, access is denied.

The content Source ID field 80 of the accessed AVT entry 70 is compared to the Source ID contained in the header of the packet. Again, a mis-match will result in denial of access to the memory array 38.

If an access request is validated, the content of the Memory Page Number field 74 of the AVT entry 70 is used, together with the low-order 12 bits of the address field 62 of the packet, to address the memory location whereat the access will take place.

Normal packets received by a CPU 12 are temporarily stored, and the high-order 20 bits of the address field 62 of the packet used with the content of the AVT base address register (not shown) to form a memory address to access the corresponding AVT entry from the AVT table 50. The accessed AVT entry is then used to validate the authenticity of the received packet, permitting read or write access to the memory array 28, depending upon the activity requested. If the message packet is an Interrupt packet, the interrupt data of the packet is written to the interrupt queue 52 of the memory array 38 after AVT validation, and the logical processor 30 notified of the receipt of the interrupt data. The logical processor 30, with a prior knowledge of the whereabouts in the memory array 38 of the interrupt queue 52, can retrieve the interrupt data and determine therefrom how best (or even whether) to proceed.

Packet communication from one element of system 10 to another involves a three-stage progression: (1) creation and dispatch of the message packet from a source element (e.g., a Requesting CPU), (2) transmission and propagation of the packet through the SAN 16 to its destination (e.g., Responding $CPU_2$ or disk storage unit 16), and (3) interpretation and processing at the destination element. For interrupt packets the third stage involves "posting" the interrupt data for action by the logical processor 30 at the Responding CPU.

Since an Interrupt packet is a request to write information (the information explaining the interrupt) to the memory array 38 of a CPU 12, that request must be also validated.

The format for an interrupt AVT entry, used to validate received Interrupt packets, is illustrated in FIG. 5. As mentioned above, Interrupt packets are constructed by another element of the system 10 (e.g., disk system 18, or one of the other CPUs 12) to deliver an interrupt information to a particular one of the CPUs. Validation is much the same as that described above in connection with validation of normal packets, except that the interface units 32 include interrupt logic (not shown) to identify where in the interrupt queue 52 the header, and accompanying interrupt-defining data, of the Interrupt packet will be stored. (The interrupt queue may be several queues, each in the form of a first-in, first-out (FIFO) storage architecture.) The interrupt logic in the interface units 32 will set a bit in an interrupt or "cause" register that operates to notify the logical processor 30 of a received interrupt. The logical processor 30 can then determine when to handle the interrupt.

As FIG. 5 shows, an AVT interrupt entry is also a quadword (128 bits) divided into five multi-bit fields. A 64-bit field 92 includes a queue base address that is used as a pointer into the interrupt queue 52 for the location at which the interrupt data carried by the received Interrupt packet will be written. A 12-bit "Permissions" field 94 describes the same permissions information as described above in connection with normal AVT entries. Since the Interrupt packets are WRITE requests, the corresponding AVT interrupt entry (which accepts only Interrupt packets) will have Interrupt Access bit (W) of the permissions field 94 set to allow the interrupt data to be written to the memory array 38 (i.e., to the interrupt queue 52). The Permissions field 94 will also have a bit position as an interrupt bit (I) set to identify the AVT entry as an interrupt AVT as opposed to an ordinary memory read or write AVT entry, and thereby to cause any packet accessing the AVT entry to be processed as an interrupt packet.

A 20-bit field 96 contains source ID information, identifying the particular system element (e.g., a CPU 12) allowed to use this AVT entry to interrupt the CPU. There will be an interrupt entry for each system element that a CPU 12 will allow to interrupt its logical processor 30. If the source ID information of the AVT interrupt entry 90 does not match that contained in the header field 60 (FIG. 3) of the incoming Interrupt packet, access to the interrupt queue 52 is denied, and an AVT error interrupt is generated.

A two-byte field 98 of the interrupt AVT entry 90 is reserved for future expansion, and finally a Type field 100 of the AVT entry 90 specifies, among other things not relevant to the present invention, the type of interrupt in terms of its "class." The class information is used to determine the interrupt level of the received interrupt; that is, it signifies how important the interrupt was thought to be by the source of the Interrupt packet, and the logical processor 30 are notified accordingly.

Summarizing, Interrupt packets delivering interrupt information are initially handled in the same manner as normal packets that, for example, request access to memory array 38 (without, themselves, notifying the logical processor 30). In fact, the only difference between a normal (non-interrupt delivering) packet and one that does deliver interrupt information is that the latter will cause the logical processor 30 of the receiving CPU 12 to be notified of its receipt (i.e., the processors 20 are interrupted), whereas the former do not themselves initiate such interruption of the logical processor 30.

This messaging system, employing as it does the interface units 32 to provide a CPU 12 the ability to write to or read from the memory array on another CPU 12 of the system 10, forms the basis of the interprocessor communication system of the present invention. An information communication between a pair of CPUs 12 according to the present invention will involve multiple information transfers as needed to provide messaging services between processes in one CPU 12 and in another CPU 12.

An information communication will be either a request/reply message or a uni-directional (no-reply) message. The information transfers for a request/reply message will occur in two phases: a request phase and a reply phase. During the first, request phase, information is transferred from a Requesting CPU 12 to a Responding CPU 12. During the second, reply phase, information is transferred in the reverse direction, from the Responding CPU 12 to the Requesting CPU 12.

The reply phase of a request/reply message may occur an indefinitely long time after the request phase. Multiple request/reply messages (communications) may be simultaneously instant, and the reply phases of request/reply messages may occur in a different order than the request phases. That is, messages may be replied to in any order.

The information transfers for a uni-directional message will occur in only one phase, a request phase. The request phase of a uni-directional message will be like the request phase of a request/reply message, except that no provision will be made for a reply to a uni-directional message.

A request phase will involve at least one transfer of information as interrupt data from the Requesting CPU 12 to the Responding CPU 12. This transfer will transmit basic information about the request, including notification to the Responding CPU 12 of the existence of the request.

A reply phase will involve at least one transfer of information as interrupt data from the Responding CPU 12 back to the Requesting CPU 12. This transfer will transmit basic information about the reply, including notification of the existence of the reply.

A request phase may include additional information transfers before and/or after the transfer of information as interrupt data. A reply phase may include additional information transfers before the transfer of information as interrupt data.

Within a request phase or a reply phase, an information transfer occurring before the transfer of information as interrupt data is referred to as a "pre-" transfer, or more specifically as a "pre-push" transfer, indicating that the sending CPU 12 uses one or more non-interrupting WRITE operations to transfer information to the memory array 38 of the destination CPU 12.

Within a request phase, an information transfer occurring after the transfer of information as interrupt data is referred to as a "post-" transfer, or more specifically as a "post-pull" transfer, indicating that the destination CPU 12 uses one or more READ operations to transfer information from the memory array 38 of the sending CPU 12.

In the request phase of either a request/reply message or of a uni-directional message, the Requesting CPU 12 will set the contents of AVT entries in the Requesting CPU 12 as needed to allow the Responding CPU 12 to perform the post-pull transfers of the request phase.

In the request phase of a request/reply message, the Requesting CPU 12 will also set the contents of AVT entries in the Requesting CPU 12 as needed to allow the Responding CPU 12 to perform any pre-push transfers of the reply phase that transfer information directly to the ultimate destination locations of the reply information within the memory array 38 of the Requesting CPU 12.

During the request phase, the Requesting CPU 12 will transfer size and location information to the Responding CPU 12 to inform the Responding CPU 12 of the proper AVT entries, addresses, and amounts of memory to access in order for the Responding CPU 12 to correctly perform the post-pull transfers (if any) of the request phase and the direct pre-push transfers (if any) of the reply phase. The information will be included in the pre-push transfers (if any) and/or in the information transferred as interrupt data of the request phase.

For a request/reply message, the Responding CPU 12 is free to perform any of the information transfers using the AVT entries that the Requesting CPU 12 has set up for this message (i.e. post-pull transfers of the request phase and/or pre-push transfers of the reply phase) at any time after the interrupt data transfer of the request phase and before the interrupt data transfer of the reply phase.

Four methods are used to transmit the various items of information for a message or a reply to a message. In the first three methods the sending CPU 12 writes or "pushes" the information to the memory array 38 of the destination CPU. In the fourth method, the destination CPU 12 reads, or "pulls" the data from the memory array 38 of the sending CPU 12.

Method 1 consists of including the information inside the interrupt data which is written to an interrupt queue of the destination CPU 12. For a sufficiently small amount of information, this method is sufficient to transfer all of it. When there is more information to transmit than can conveniently fit into the interrupt data, then method 1 is augmented by other methods.

Method 2 is "pre-push" of the information to a pre-push buffer. In this method, prior to transmission of the interrupt data, the sending CPU 12 "pushes" the data to a portion of the memory array 38 in the destination CPU 12 that has been set aside to receive information from this sending CPU 12 and to hold the information temporarily before it is examined and processed as indicated by the subsequent interrupt data. Often, information transferred by this method will be moved again, to its ultimate destination in memory of the receiving CPU 12.

Method 3 is "pre-push" directly to the ultimate destination in the memory array 38 of the receiving CPU 12, rather than to a pre-push buffer. This method is used by a Responding CPU 12 to transfer reply information of a request/reply message directly to designated reply buffers in the Requesting CPU 12.

Method 4 is the "post-pull" method, in which the destination CPU 12 reads the information from the memory array 38 of the sending CPU 12 after receipt of the interrupt data.

With methods 1, 2, and 3, the arrival of the interrupt data completes the transfer of all the information that the destination CPU 12 needs in order to process the request or reply. With method 4 (post-pull) there is more information remaining to be transferred after the arrival of the interrupt data, and the destination CPU 12 is invited to "pull" that remaining information.

Unless there is a large amount of request information to be transferred, an information communication according to the present invention will follow a protocol, termed a "pre-push" protocol, in which only methods 1, 2, and, 3 will be used. If there is a large amount of request information then the communication will use a protocol, termed a "post-pull" protocol, in which method 4 will be used, and the Responding CPU 12 will perform the additional step of reading or "pulling" request data.

Two basic protocols are employed for interprocessor communication: using a "pre-push" protocol, the Requesting CPU 12 writes the message data to the memory array 38 of the Responding CPU 12 (using a Write message packet), followed by an Interrupt packet that writes interrupt data to the memory array 38 of the Responding CPU 12$_2$, and notifies the logical processor 30 of the Responding CPU 12$_2$ of the presence of that interrupt data. The second protocol, a "post-pull," is used for larger amounts of data transfers and involves the Requesting CPU 12$_1$ writing an interrupt data (via an Interrupt packet) to the memory array 38 (i.e., the interrupt queues 52) of the Responding CPU 12$_2$, describing information as to the location in the memory array 38 of the Requesting CPU 12$_1$ of the message data. The Responding CPU 12$_2$ may then decide when to read the memory array 38 of the Requesting CPU 12$_1$ to retrieve the message data.

Figure 6:
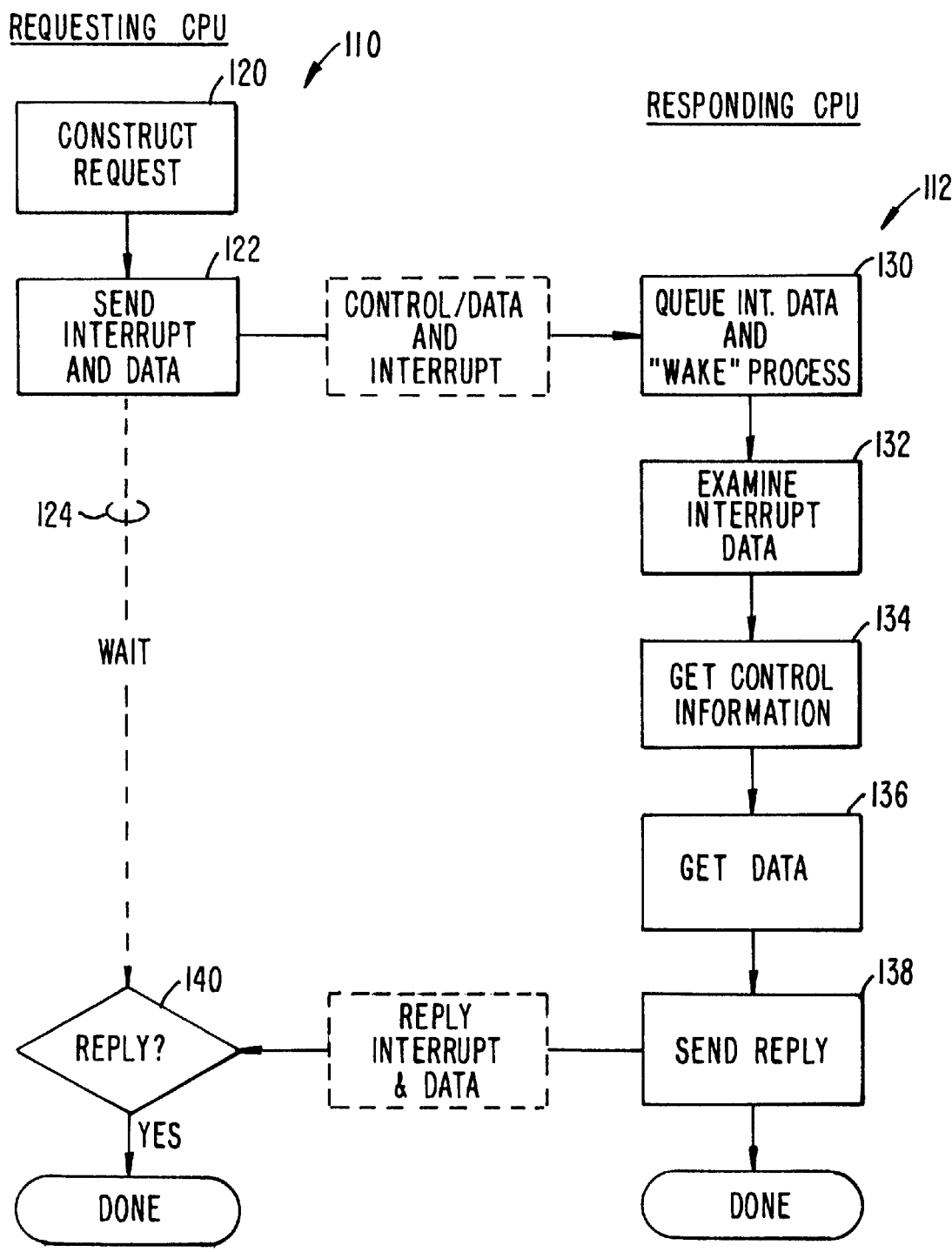
FIG. 6 is a flow diagram illustrating generally the steps taken by Requesting and Responding processors (CPUs) to initiate, send, and respond to a request message sent by the Requesting processor.

FIG. 6, illustrates an overview of an interprocessor communication according to the present invention. (The separate pre-push and post-pull protocols are discussed in greater detail below.) FIG. 6 shows an interprocessor communication beginning at step 120 with the logical processor 30 of the Requesting CPU, for example CPU 12$_1$, setting up two data structures in the memory array 38, describing the message information and interrupt data that will be carried by an Interrupt packet to the Responding CPU (e.g., CPU 12$_2$) to notify it of the presence of the control information and data. (How and when the message date buffers and interrupt data are transferred from the Requesting CPU 12 to the Responding CPU 12 depends upon the protocol used, i.e., the pre-push or the post-pull protocol, and this in turn depends upon the amount of information to be transferred.) The interrupt data will include a description of the size and location of control information and data, the identification of the requesting and responding processes, and a sequence number. If the message information to be passed from the Requesting CPU to the Responding CPU is less than a predetermined amount (e.g., 512 bytes), the interprocessor communication will use the pre-push protocol, and the interrupt data will notify the logical processor 30 of the Responding CPU$_2$ that the message information resides in its memory array 38. If, on the other hand, the message information is greater than or equal to the predetermined amount, the message information will be left in the memory array 38 of the Requesting CPU 12$_1$, and the interrupt data will provide an address for the Responding CPU 12$_2$ to use to retrieve the message information.

The data structures that are set up in the memory array 38 will describe the necessary information for use by the BTE (not shown) of the interface units 32 in constructing the one or more message packets with the message information and an Interrupt packet of the form illustrated in FIG. 3. With the data structure in place in the memory array 38, the logical processor 30 will, in step 122, initiate operation of the interface units 32 of the Requesting CPU$_1$ (and the Responding CPU$_2$) to transfer the interrupt data and the message information from the memory array 38 of the Requesting CPU to that of the Responding CPU. (Again, when the message information is transferred depends upon its size.) The logical processor 30 of the Requesting CPU, at step 124, then relinquishes supervision and control of the communication process to the interface units 32 to return to other duties. The process initiating the communication may go into a "wait" state to await a reply from the Responding CPU 12$_2$.

When the Interrupt packet is received at the Responding CPU 12$_2$, the interrupt data it includes will be written to an interrupt queue 52 (FIG. 2) by interrupt handling logic (not shown) of the interface units 32. Then, the interrupt logic (not shown) will generate an internal interrupt (i.e., as opposed to an Interrupt packet sent via the SAN 16) to attract the attention of the logical processor 30 to the fact that an Interrupt packet has been received and that the interrupt data it contains is available for examination in the interrupt queue 52. After being notified, and at a time convenient, the logical processor 30 at step 132 will retrieve the interrupt data from the interrupt queue 52. An examination of the interrupt data set-up information will inform the logical processor 30 the size of the message information and where it is located. For example, if the size of the message information is less than the predetermined amount, the logical processor 30 will know that the message information resides in the pre-push buffer 54 area of the Responding CPU 12$_2$. (The interrupt data also describes whether or not information has been pre-pushed) Conversely, if the size of the message information is greater than or equal to the predetermined amount, the logical processor 30 will know that it must retrieve the message information in the memory array 38 of the Requesting CPU 12$_1$ by issuing a READ request to read data beginning at an address identified in the interrupt data.

Therefore, in steps 134 and 136, the Responding processor 12$_2$ will retrieve the message information, and examine the control information in order to determine what is to be done with the data (if any accompanies the information).

At step 138, once the Responding CPU $12_2$ has serviced the request, it will construct data structures in its memory array 38 describing reply data to be written to the memory array 38 of the Requesting CPU $12_1$, at a reply address indicated by address information supplied by the Interrupt packet that initiated the current communication. If the communication was a request for data, the reply will be accompanied by that data. Replies always employ the pre-push protocol, regardless of the size of any data sent as a part of that reply. The data structures, then, will describe any data to be sent, and interrupt data that informs the Requesting CPU of the outcome of the communication. The logical processor 30 (of the Responding CPU) will turn control over to the interface units 32 which, in turn, will initiate the necessary activity to construct WRITE packets that are sent to the Requesting CPU that will cause the reply data (if any) to be written to the memory array 38 of the Requesting CPU. That write operation is followed by another write operation that transfers the reply interrupt data, via an Interrupt packet, that is written to the interrupt queue 52 of the Requesting CPU. The logical processor 30 of the Requesting CPU are interrupted and informed by the interrupt data, that the communication is complete (or if not complete, why not), and of the size (i.e., amount) of any data sent in response to a request therefore. (Note that the Requesting CPU need not be informed, by the reply, of the location of any data sent. This is because the Requesting CPU specified, with the initiation of the communication being concluded by this reply, where the data is to be placed.)

Receipt of reply information by the Requesting CPU at step 140 concludes the communication.

Figure 7:
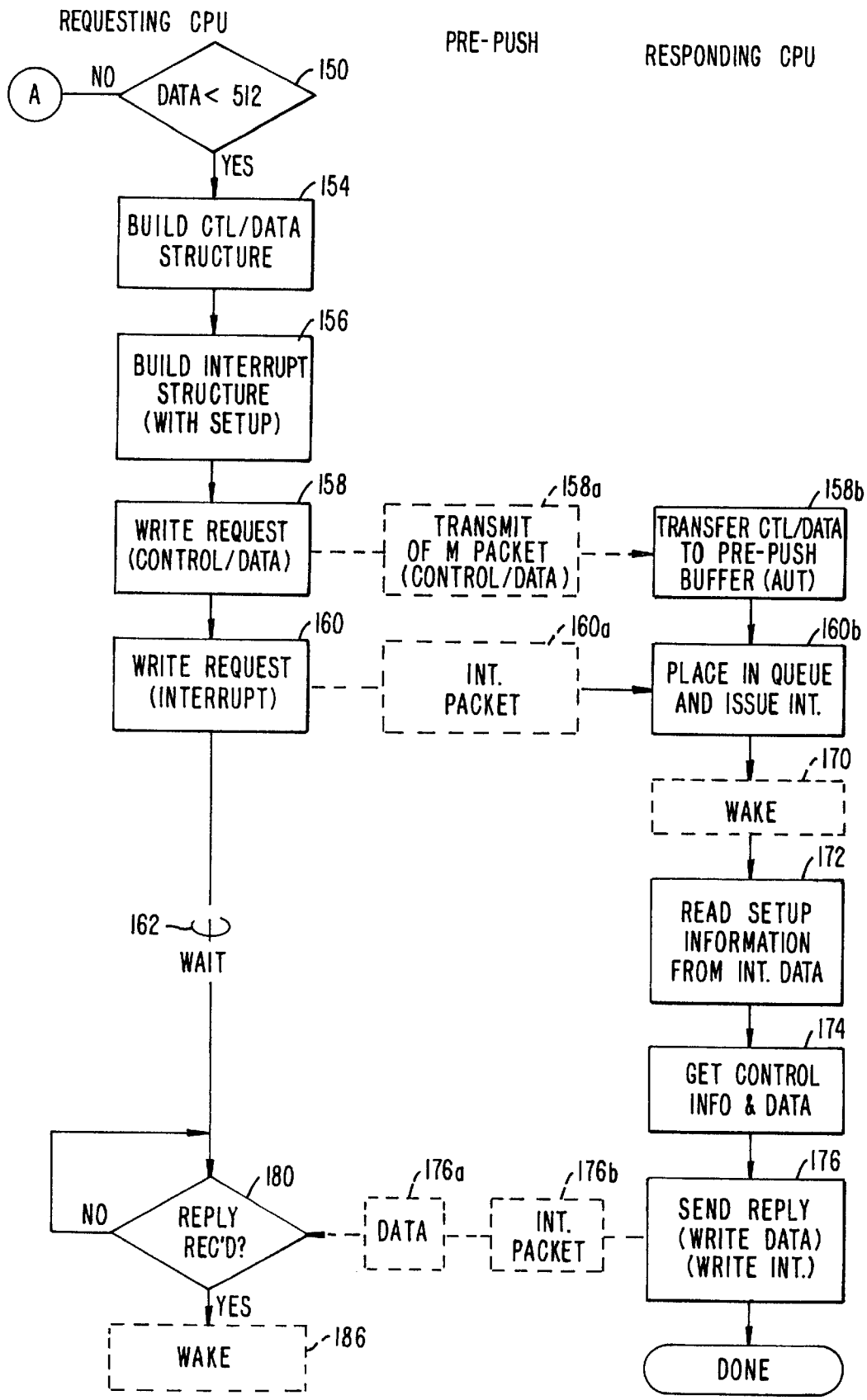
FIG. 7 is a flow diagram illustrating the steps of the colloquy between communicating CPUs of FIG. 1 to transmit a request message with less than a predetermined amount of data from one processor to another.
Figure 8:
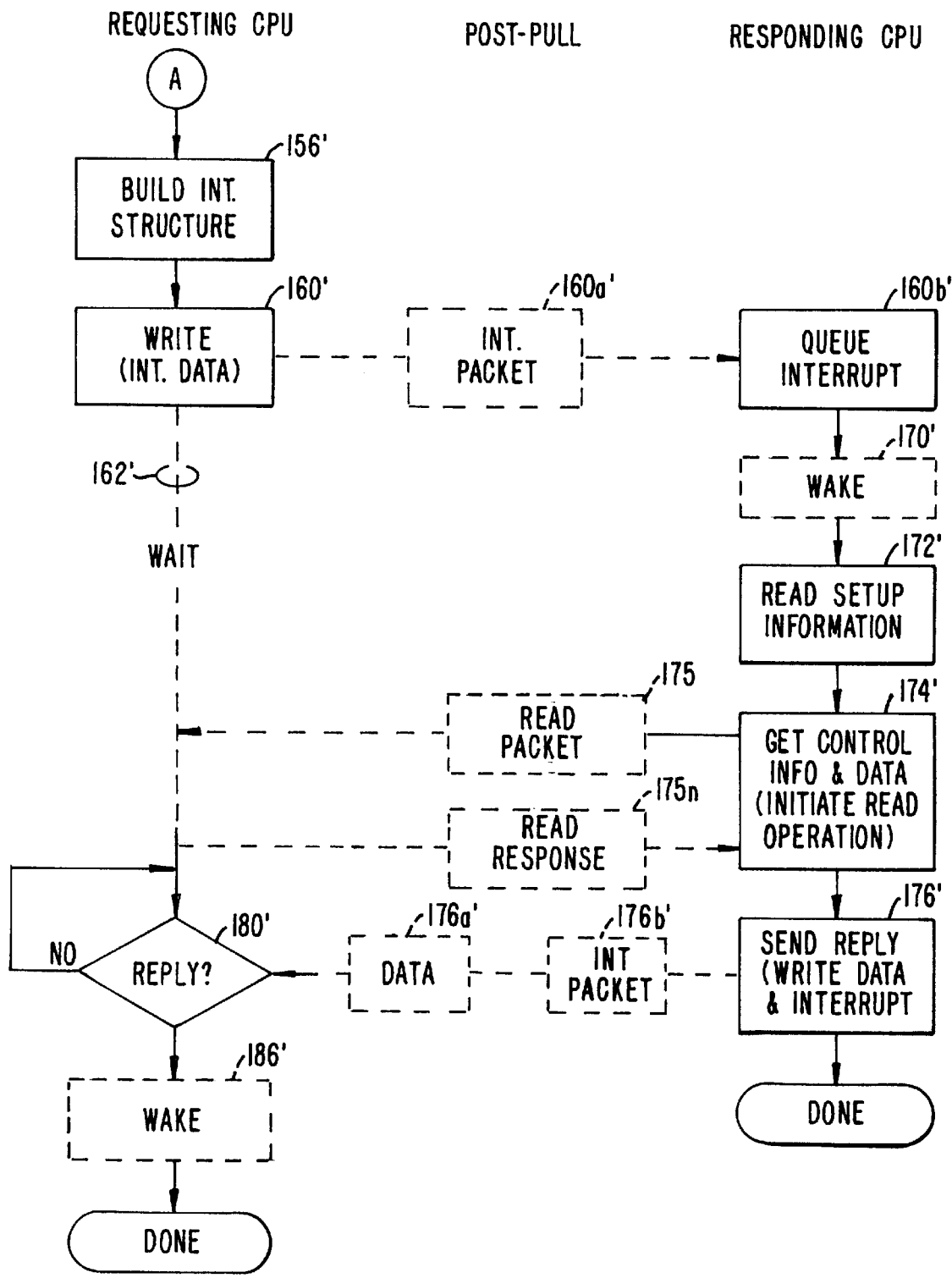
FIG. 8 is a flow diagram that illustrates the steps of the colloquy between communicating processors of FIG. 1 to send a request message with message/data greater than or equal to the predetermined amount from one processor to another.

As indicated, two different protocols are used depending upon the size of the message information. Those two protocols are illustrated in more detail in FIGS. 7 and 8. FIG. 7 shows the pre-push protocol for message information sizes less than a predetermined amount, and FIG. 8 shows the post-pull protocol for amounts of message information greater than or equal to the predetermined size.

Turning first to FIG. 7, the Requesting CPU $12_1$, at step 150, determines the size of the data to be sent in order to select which protocol to use. If that size is greater than or equal to the predetermined amount, the process exits step 150 in favor of the post-pull protocol of FIG. 8, discussed below. If, however, the data is less than the predetermined amount 512 bytes, step 150 is exited in favor of the pre-push protocol which begins at step 154.

In step 154 the logical processor 30 of the Requesting CPU will build the necessary data structures in the memory array 38, describing the data to be sent to the Responding CPU. Next, at step 156, the processor will build a data structure for the interrupt data which will include such information as the location of the message information, its size, the address at which the reply is to be written and the address whereat any data accompanying the reply should be written.

Also, with the construction of these data structures, the logical processor 30 will ensure that the AVT table 50 will contain the appropriate entry for validating the expected reply from the Responding CPU, and translating the address contained in the reply (i.e., the reply Interrupt packet) to a physical memory address whereat the interrupt data will be written.

Once these data structures have been constructed, the logical processor 30 will initiate operation of the interface units 32 to, at step 158, construct and send the necessary one or more WRITE message packets (158a) that will communicate the message information to the Responding CPU where it is written to the memory array 38 of that CPU. At the Responding CPU, a portion of the address field 62 of each received message packet (FIG. 3), as explained above, is used to access an AVT entry (FIG. 4) that is used to translate the address field to a physical address of the memory array 38 at which the data of the packet will be written—provided proper authorization to do so is found.

Digressing for the moment, each CPU 12 of the system 10 will set aside and maintain, in its memory array 38, a pre-push buffer area 54 (FIG. 2), containing four pre-push buffers for each of the other CPUs 12 of the system. Each pre-push buffer has room for 512 bytes of data. Each CPU 12 is supplied with the address of the buffer areas 54 of each of the other CPUs 12. It is this address that is supplied for use in the WRITE message packets 158a.

At the receiving end in regard to the transfer of the message packets 158a, i.e., at the Responding CPU 12, the interface units 32 will access the AVT entry corresponding to the message packets (using at least a portion of the packet's address field 62—FIG. 3), verify/authenticate the requested operation (i.e., write to memory), develop a physical memory address from information of the address field of the message packet, together with a base address (field 74—FIG. 4) of the AVT entry, and write the data to the memory array 38 of the Responding CPU $12_2$.

The formation and transmission of the packets 158a containing the message information is followed, at step 160, by the formation, by the interface unit 32 (of the Requesting CPU), of another WRITE request that is communicated as an Interrupt packet 160a to the Responding CPU. Having completed the initial stages of the communication, the processor 30 (i.e., the requesting process) enters a state 162 to await a reply that will inform the Requesting CPU $12_1$ that the request has been complied with.

When the Responding CPU $12_2$ receives the Interrupt packet 160a, the address field 62 of the Interrupt packet is used to access an interrupt AVT entry which will direct the interrupt data of the packet to the interrupt queue 52 of the Responding CPU (step 160b). An (internal) interrupt is then issued to gain the attention of the Responding CPU's logical processor 30. The interrupt will "wake" the logical processor 30 (step 170). At a convenient time, the logical processor 30, at step 172, will access the interrupt queue 52 to read the interrupt data. Finding that the size of the message information indicates a pre-push messaging operation, the logical processor 30 will know that the control information/data resides in the Responding CPU's memory array 38 at the push buffer area 54. Accordingly, at step 174, the logical processor 30 can then retrieve the message information and service the request, according to the message information (i.e., store the accompanying data or perform whatever other activity is requested).

The Responding CPU will then notify the Requesting CPU that the communication has been serviced, by returning, at step 174, to the Requesting CPU a reply data packet 176a (if the communication requires that data be sent to the Requesting CPU) and an interrupt packet 176b, both sent according to the pre-push protocol. Thus, in the same manner that the communication was initiated, the processor will construct an appropriate data structure in memory to describe the reply's message information, as well as a data structure for the interrupt data. The interface units 32 are then commanded to construct and send WRITE request and Interrupt packets 176a and 176b to respectively cause the reply message information and interrupt data to be written to the memory array 38 of the Requesting CPU. The reply message information is written to a memory address supplied by the earlier Interrupt packet 160a. The interrupt data is written to the memory address used by all CPUs to access the interrupt queue 52 of the Requesting CPU. Receipt of the reply Interrupt packet will wake the logical processor 30 to the fact that the reply has been received (step 186), concluding the colloquy for the Requesting CPU.

Returning to step 150, if the Requesting CPU determines that the data to be sent the Responding CPU is greater than or equal to the predetermined amount, the post-pull protocol, illustrated in FIG. 8, will be used. Many of the steps of the post-pull protocol are the same as those used by the pre-push protocol (FIG. 7), and are identified in FIG. 8 with the same reference number but with a ' added such as, for example, step 156 (pre-push protocol—FIG. 7) and step 156' (post-pull protocol—FIG. 8).

Step 150 of FIG. 7 will be exited at A then, if the size of the message information so indicates, in favor of step 156' of FIG. 8 in which the Requesting CPU will build the data structure in memory array 38 for an Interrupt packet (160a') to be delivered to the Responding CPU. The interrupt data, which will be carried by the transmitted Interrupt packet 160a', will identify to the Responding CPU, as did the Interrupt packet 160a of the pre-push protocol, the size and location of the data. This time, however, the location will mark the data as residing in the memory array 38 of the Requesting CPU.

At step 160', therefore, the interface unit 32 will construct the Interrupt packet 160a' and send it on its way to the Responding CPU where, at step 160b', the interrupt data is written to the interrupt queue 52 (of the Responding CPU), and an interrupt generated to wake (step 170') logical processor 30 of the Responding CPU.

The logical processor 30 will examine the interrupt data, and note that the size of the message information indicates its location as the memory array 38 of the Requesting CPU. The Responding CPU will proceed to step 174' to retrieve that data.

Retrieval involves construction of a READ request packet in the form of FIG. 3, containing only fields 60, 62, and 66. Since data is not being transmitted, the READ packet will not contain a data field 64. The header field, of course, will contain the source ID (Responding CPU), destination ID (Requesting CPU), and an indication of the address at which the data to be read resides, as provided by the interrupt data delivered by the Interrupt packet 160a'. The READ request packet (175) will then be sent to the Requesting CPU, and handled by its interface units 32. The interface units 32 use the address field, in part, to get the corresponding AVT entry, and after the access is confirmed the data will be retrieved, used to form one or more READ response packets 175$_n$ (depending upon the amount of data), and sent to the Requesting CPU. The interface units 32 of the Responding CPU will then write the data to its memory array 38.

Once the message information is transferred from the memory array 38 of the Requesting CPU, and written to the memory array of the Responding CPU, the logical processor 30 of the Responding CPU is again interrupted. From there on, the procedures are basically the same as that of the pre-push protocol (FIG. 7): at step 176' data and Interrupt packets 176a' and 176b' are constructed and sent to the Requesting CPU where it is received and handled as step 180', concluding participation of the Requesting and Responding CPUs in the communication.

At the Requesting CPU, the data and Interrupt packets 176a' and 176b' will cause the logical processor 30 to be awakened, at step 186' to handle the reply as necessary.

In summary, there has been disclosed an interprocessor messaging system in which message information is transferred from one processor to another processor by memory to memory transfers. In particular, for pre-push messaging, an important aspect of the invention is self-management of the pre-push area (i.e., the pre-push buffers) of the memory of the Responder CPU by the Requestor CPU. The Requestor CPU, knowing the location and size of the pre-push buffers, can use as little or as much of the pre-push buffers allocated it—without involvement of the Responder CPU until notified (by an interrupt).

What is claimed is:

1. A method of communication between at least two processor units of a multiprocessor system, each of the processor unit including a memory element for storing data, the method comprising the steps of:

connecting the processor units to permit each of the two processor units to access the memory of the other;

one of the two processor units sending message data to the other processor unit by writing the message data to a predetermined location of the memory element of the other processor unit;

the message data including (1) interrupt information that causes the other processor unit to review the interrupt information and (2) location information describing data contained in the memory element of the one processor unit and including the step of the other processor unit reading data from the memory element of the one processor unit for transfer to the memory element of the other processor unit if the message data is greater than a predetermined amount.

2. The method of claim 1, wherein the message data includes control information and data, the control information concerning the disposition of the data.

3. The method of claim 1, wherein the message data includes information describing data contained in the memory element of the one processor unit, and including the step of the other processor reading data from the memory element of the one processor for transfer to the memory element of the other processor unit.

4. The method of claim 1, wherein the location information further describing the location and amount of the data contained in the memory element of the one processor.

5. The method of claim 1, wherein the message data comprises:

data;

control information describing the data; and interrupt data that notifies the other of the processor units of the existence of the control information and the data.

6. The method of claim 1 wherein the message data comprises a first packet containing control information and data and a second packet containing interrupt information, the one processor unit sending the first packet for writing to the memory element of the other processor unit before sending the second packet.

7. The method of claim 6, wherein the interrupt information is written to the memory of the other processor unit in a manner that informs the other processor unit that the interrupt information is present and the location in the memory element of the interrupt information.

8. The method of claim 7, wherein the interrupt information includes location information indicative of where in the memory element of the other processor unit the control information and the data are stored.

9. The method of claim 7, wherein the interrupt information includes size information indicative of the size of the control information and data.

10. The method of claim 1, wherein the message data includes interrupt data having information indicative of a location in the memory element of the one processor unit of data, and including the step of the other processor unit initiating operations to read the data from the memory element of the one processor unit.

11. The method of claim 1, wherein the message data includes interrupt data indicative of a size of communication data for the other processor unit.

12. The method of claim 11, wherein the size of the data is indicative of a location of the communication data.

13. The method of claim 12, wherein the location of the communication data is indicated as being in the memory element of the other processor unit if the size of the communication data is less than a predetermined size.

14. The method of claim 13, wherein the location of the communication data is indicated as being in the memory element of the one processor if the size of the communication data is greater than the predetermined size.

15. The method of claim 14, wherein the memory elements of the one and the other processor units are addressable, and the interrupt information includes an address indicative of an address of the communication data.

16. A method of communication between at least first and second processor units of a multiprocessor system, each of the first and second processor units including a memory element for storing data, the communication including message data, the method comprising the steps of:

connecting the first and second processor units in a manner that provides access of each of the first and second processor units to the memory element of the other for reading data from or writing data to such memory element; and the first processor unit sending a message to the second processor unit by writing the message to the memory element of the second processor unit;

wherein the message includes interrupt data indicative of a location of message data;

if the size of the message data is greater than a predetermined size then including the step of the second processor unit reading the message data from the memory element of the first processor unit at the location.

17. The method of claim 16, wherein the message data is included in the message if the size is less than the predetermined size.

18. The method of claim 16, wherein the message includes address data indicative of (1) the location of the message data in the memory element of the second processor element if the amount of the communication data is less than the predetermined amount or (2) the location of the the size of the message data in the memory element of the first processor element if the amount of the message data is greater than or equal to the predetermined amount.

19. The method of claim 18, wherein the message includes control information indicative of disposition of the message data by the second processor.

20. The method of claim 19, including the step of the second processor unit sending a reply message to the first processor unit by writing the reply message to the memory of the first processor unit after receipt of the message data.

21. The method of claim 20, wherein the message includes reply address data indicative of where in the memory element of the memory element of the first processor unit the reply message is to be written, the reply message being written in the memory element of the first processor unit at a location indicated by the reply address data.

22. The method of claim 21, wherein the reply message includes information as to the status of an outcome of the disposition of the message data.

23. The method of claim 22, wherein multiprocessor system includes at least one peripheral element, and wherein the connecting step includes forming a communication path that includes the access of each of the first and second processor units to the memory element of the other for reading data from or writing data to such memory element and communicating access between the first and second processor units and the peripheral element.

24. A method for communicating message data from a first processor unit to a second processor unit of a multiprocessor system, each of the processor units including a memory element for storing data, the method including the steps of:

connecting the first and second processor units in a manner that provides access of each of the first and second processor units to the memory element of the other for reading data from or writing data to such memory element;

if the message data is less than a predetermined amount, the first processor unit sending one or more message packets containing the message data to the second processor unit to write the message data to the memory element of the second processor unit, and then sending an first interrupt message packet to write interrupt data to the memory element of the second processor unit describing the message data;

if the message data is greater than or equal to the predetermined amount, the first processor sending a second interrupt message packet to the second processor unit to write interrupt data to the memory element of the second processor unit to identify a location in the memory element of the first processor unit whereat the message data is stored, the second processor unit sending a read message packet to cause transfer of the message data from the memory element of the first processor unit to the second processor unit.

25. The method of claim 24, wherein if the message data is less than the predetermined amount the message data is written in a predetermined memory location of the memory element of the second processor unit.

26. The method of claim 24, wherein the step of the second processor unit sending a read message includes the step of the first processor responding to the read message by sending to the second processor unit one or more read response messages containing the message data.

* * * * *